April 9, 1929.  W. A. CHRYST  1,708,215

CLUTCH

Filed Aug. 27, 1925

Inventor
William A. Chryst
By Spencer Sewell & Hardman
his Attorneys

Patented Apr. 9, 1929.

1,708,215

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

CLUTCH.

Application filed August 27, 1925. Serial No. 52,929.

This invention relates to one-way clutches of the cam and ball or roller type, including a plurality of balls or rollers which are wedged between a cylindrical surface provided by one of the clutch members and individual camming surfaces provided by the other clutch member. In clutches of this type, the rollers do not always become wedged sufficiently to transmit the driving force applied to one of the clutch members, but frequently slip and revolve without transmitting any motion.

It is one of the objects of the invention to increase the reliability of clutches of this type by providing means for causing the rollers to become wedged immediately as one of the clutch members undertakes to drive the other, so that the clutch will always function.

Further objects and advantages of the present invention will be apparent from the following description, reference being had to the accompanying drawings, wherein a preferred form of the present invention is clearly shown.

Figure 1:
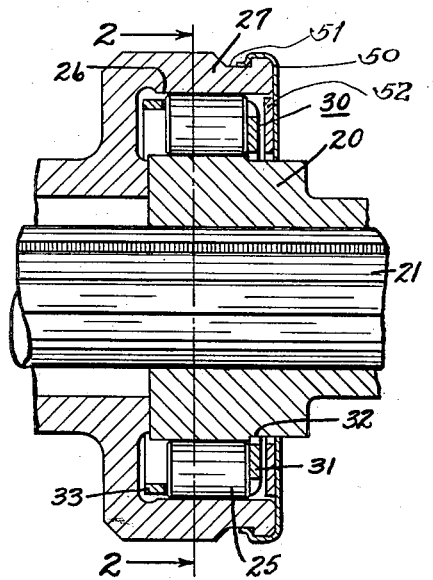
Fig. 1 is a longitudinal sectional view of a clutch embodying the present invention.
Figure 2:
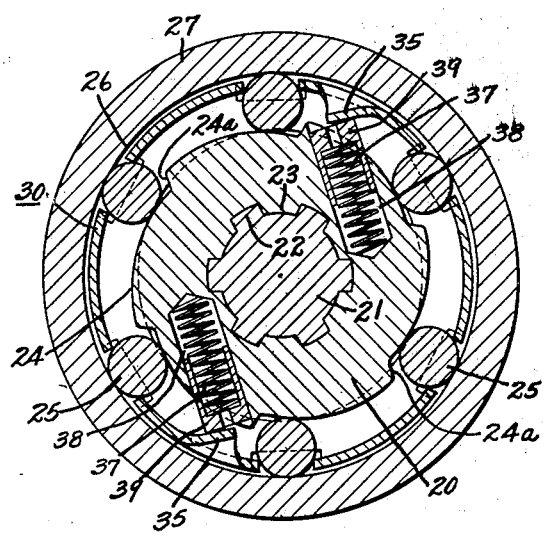
Fig. 2 is a sectional view on line 2—2 of Fig. 1.

Referring to the drawings, the clutch includes a driving member 20, which may be connected with a driving shaft 21 by splines 22 and 23 connected, respectively, with the shaft 21 and the clutch member 20. The member 20 is provided with a plurality of cylindrical camming surfaces 24, each surface being a segment of a cylinder, the axis of which is eccentric to the axis of the shaft 21. Each surface 24 is engaged by a cylindrical roller 25, and each roller 25 cooperates with the inner cylindrical surface 26 of a clutch shell or ring 27, constituting the driven member of the clutch. It is apparent that, when the driving member 20 rotates in a clockwise direction as viewed in Fig. 2, each of the rollers 25 will be wedged between one of the camming surfaces 24 and the cylindrical surface 26, so that a driving force is transmitted from the clutch member 20 to the clutch shell 27. It is apparent that member 27 will overrun if rotated in a clockwise direction as viewed in Fig. 2 at a greater speed than member 20. Member 27 will become the driving member when rotated counterclockwise relative to member 20, but member 27 is preferably the driven member, because, if member 27 is the driven member, its overrunning at high speed will not cause the rollers 25 to rotate at the same speed and grip the surface 26 due to a large amount of centrifugal force.

Figure 3:
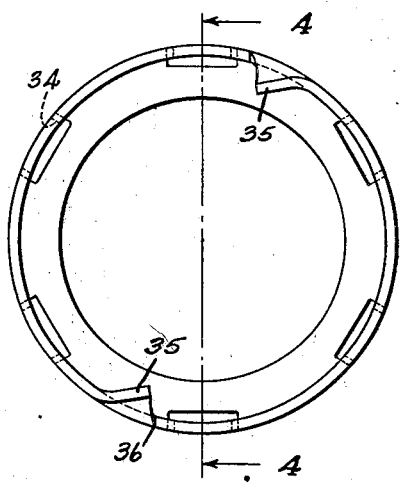
Fig. 3 is an end view of a cage for equalizing the action of the various rollers or balls of the clutch.
Figure 4:
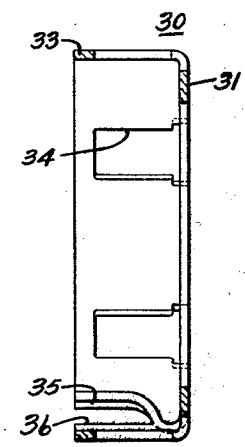
Fig. 4 is a sectional view on line 4—4 of Fig. 3.

In order to prevent slipping or "skidding" of the rollers, when one of the members starts to drive the other, the rollers are normally maintained by spring pressure in wedging engagement with the driving and driven members. To accomplish this, there is provided a cage 30 having a perforated end face 31, for receiving the hub 32 of the clutch member 20. The cylindrical flange 33 of the cage 30 is provided with a plurality of equidistant openings 34, each adapted to receive a roller 25, as clearly shown in Fig. 2. The cage 30 is provided with diametrically opposite lugs 35. Each lug 35 is formed, as shown in Figs. 3 and 4, by cutting partly through the flange 33, as indicated at the line 36 in Figs. 3 and 4, and then bending the metal of the flange 33 adjacent the cut 36 inwardly to form the lug 35. The roller cage 30 is urged in a counterclockwise direction relative to the driving member 20, by springs 37, each received by a socket 38 provided in the driving member 20, and each pushing against a sleeve 39 which engages one of the lugs 35. In this manner, each roller 25 is yieldingly urged into gripping position between the cam surfaces 24 and the cylindrical surface 26. As all of the rollers 25 are urged to the same degree in this direction, it is apparent that at the instant the member 20 starts to drive the member 27, driving force will be transmitted immediately through the rollers, since the rollers are all normally located in wedging position between the cylindrical surface 26 and the camming surfaces 24.

If the clutch shell member 27 should rotate at a greater speed than the camming member 20 in a clockwise direction, friction between the surfaces of the rollers 25 and the cylindrical surface will cause the rollers 25 to move toward the shoulders 24ª, which separate the camming portions 24. When some of the rollers 25 start to move in this direction relative to the camming member 20, all of the rollers 25 will be moved, since they are all connected by the cage 30. In this way, any tendency of some of the rollers to stick and prevent overrunning of the clutch shell 27, is avoided.

The numeral 50 designates a retainer plate which surounds the clutch member 20 and has its edge spun over the edge of the cup-shaped clutch member 27 and into the peripheral groove 51 formed in said cup-shaped member. An abutment ring 52 is secured to the inside surface of the retainer plate in any suitable manner, said ring being engageable by the cage 30. The retainer plate 50 prevents accidental removal of the cage 30 and its wedging members from the clutch member 27.

While the form of embodiment of the invention as herein disclosed, constitutes a preferred form, it is to be understood that other forms might be adopted, all coming within the scope of the claims which follow.

What is claimed is as follows:

1. A one-way automatic clutch comprising, in combination, a clutch member having an internal cylindrical surface; a clutch member having a plurality of camming surfaces non-parallel to the cylindrical surface, a plurality of wedging elements adapted to be wedged between the adjacent surfaces of the clutch members; a sheet metal spacer cage for said wedging elements, said cage comprising a ring shaped portion having a cylindrical flange provided with a plurality of spaced apertures containing the wedging elements, and comprising, inwardly extending lugs provided by the flange portion of the cage and means engaging said lugs yieldingly urging the cage to rotate relative to the clutch members.

2. A one-way automatic clutch comprising, in combination, a clutch member having an internal cylindrical surface; a clutch member having a plurality of camming surfaces non-parallel to the cylindrical surface, a plurality of wedging elements adapted to be wedged between the adjacent surfaces of the clutch members; a sheet metal spacer cage for said wedging elements, said cage comprising a ring shaped portion having a cylindrical flange provided with a plurality of spaced apertures containing the wedging elements and comprising a plurality of tongues formed in the flange portion of the cage and bent toward its axis thereby providing inwardly extending lugs on said cage and spring loaded devices supported by one of the clutch members, engaging the lugs, yieldingly to urge the cage to rotate relative to both of said clutch members.

In testimony whereof I hereto affix my signature.

WILLIAM A. CHRYST.